June 28, 1932.    W. BAUERSFELD    1,864,576
COORDINATE TRANSFORMER
Filed April 25, 1930

Inventor:
Walther Bauersfeld

Patented June 28, 1932

1,864,576

UNITED STATES PATENT OFFICE

WALTHER BAUERSFELD, OF JENA, GERMANY, ASSIGNOR TO THE FIRM CARL ZEISS, OF JENA, GERMANY

COORDINATE TRANSFORMER

Application filed April 25, 1930, Serial No. 447,399, and in Germany April 9, 1929.

The subject of the invention is to provide a device for finding by means of the co-ordinates of points of a two dimensional object, which relate to a plane system of rectangular co-ordinates, those co-ordinates of the said points which relate to another system of rectangular co-ordinates turned relatively to the said first system of co-ordinates by the origin of same.

According to the invention such device is equipped with a wheel gear coupling two shafts in such a way that by setting one shaft in accordance with the co-ordinates of a point with respect to one system of co-ordinates, the other shaft is set according to the co-ordinates of this point with respect to the other system of co-ordinates.

A suitable execution of a device according to the invention consists therein that two shafts, of which each, in order to suit the alteration of one of the two co-ordinates ($X_1'$ and $Y_1'$) of a point moving in a plane, can be adjusted relatively to a system of rectangular co-ordinates (system $X'$, $Y'$) lying in this plane, are coupled with two other shafts by means of two differential gears of which each of the two respective planet wheels coacts with one of the two first said shafts (which must be adjusted), whereas of the two crown wheels each is connected with one of the two last mentioned (driven) shafts. The said shafts must be coupled in such a way that each of the two driven shafts is turned in accordance with the alteration of the respective co-ordinate ($X_1$ and $Y_1$, respectively) of the said point with respect to a second system of rectangular co-ordinates (system $X$, $Y$) which is turned relatively to and in the plane of the system $X'$, $Y'$ by an angle $\alpha$. In order to allow the co-ordinates of being transformed to suit different angles $\alpha$, it is recommendable to have a change gear between each of the four crown wheels and the appertaining driven shafts.

Figure 2:
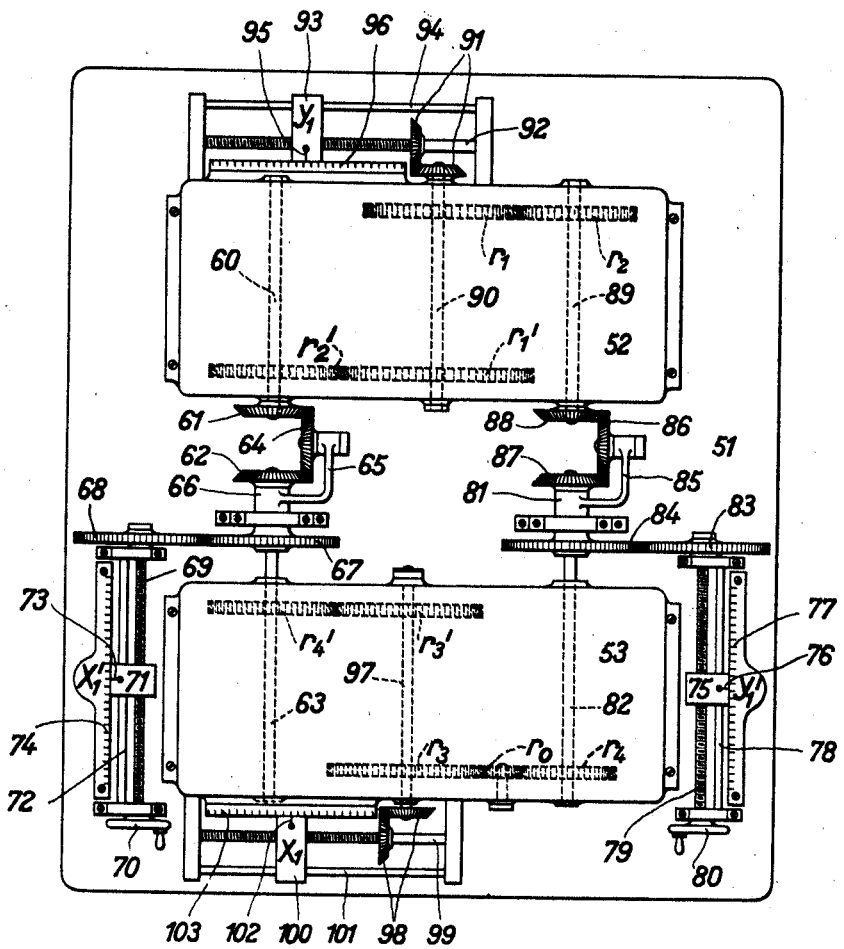
Figure 1:
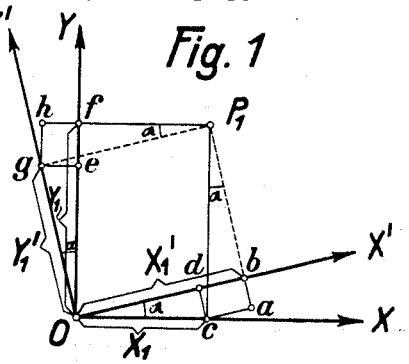

In the accompanying drawing the schematic Figure 1 serves for explaining the invention, whereas the Figure 2 represents a constructional example of the invention in plan view.

Figure 1 shows two systems of rectangular co-ordinates with the axes $X$ and $Y$ and, respectively, $X'$ and $Y'$, having the same origin $O$ and turned relatively to each other by an angle $\alpha$. Taking the reference letters designating the different parts of the drawing, the following equations are obtained for the co-ordinates $X_1$ and $Y_1$ and, respectively, $X_1'$ and $Y_1'$ of a point $P_1$.

(1) $X_1 = \overline{P_1 h} - \overline{fh} = \overline{P_1 h} - \overline{eg} = X_1' \cos \alpha - Y_1' \sin \alpha$ (2) $Y_1 = \overline{ef} + \overline{Oe} = \overline{gh} + \overline{Oe} = X_1' \sin \alpha + Y_1' \cos \alpha$ (3) $X_1' = \overline{Od} + \overline{bd} = \overline{Od} + \overline{ac} = X_1 \cos \alpha + Y_1 \sin \alpha$ (4) $Y_1' = \overline{P_1 a} - \overline{ab} = \overline{P_1 a} - \overline{cd} = Y_1 \cos \alpha - X_1 \sin \alpha$ (5) $\overline{OP_1} = \sqrt{X_1^2 + Y_1^2} = \sqrt{X_1'^2 + Y_1'^2}$.

A device (comprising two shafts and a wheel gear) corresponding to the invention must be constructed in such a way that, when by means of the said gear one shaft is adjusted in accordance with the co-ordinates of a point with respect to one of the two systems of co-ordinates, the other shaft is imparted such an adjustment that the relations of the said equations always hold good.

The constructional example illustrated by Fig. 2 is based on the simple case in which the angle about which the co-ordinate systems for the transformation of co-ordinates are turned relatively to each other is constant. As will be deduced later on, this angle has the value $\alpha = 53° 10'$.

Two housings, 52 and 53, are fixed on a base plate. In the housing 52 are provided, two wheels $r_1$ and $r_2$ which mesh with each other and have a gear ratio of 6:5, and two wheels $r_1'$ and $r_2'$ which also mesh with each other and have a gear ratio of 8:5. In the housing 53 are provided, two wheels $r_3'$ and $r_4'$ which mesh with each other and have a gear ratio of 6:5, and two wheels $r_3$ and $r_4'$ which mesh with an intermediate wheel $r_0$ and have a gear ratio of 8:5. To the shaft 60 carrying the wheel $r_2'$ is fixed a bevel gear 61, belonging to a differential gear whose other bevel gear 62 is fast with the shaft 63 carrying the wheel $r_4'$. The appertaining planet wheel 64, which has the same number of teeth as each of the bevel gears 61 and 62, is revolubly mounted on an arm 65 which is fixed to a wheel body 66 revolubly mounted on the shaft 63. This wheel body 66 is provided with teeth 67 meshing with a toothed wheel 68 which, through the agency of a shaft 69, can be rotated by means of a hand wheel 70. The shaft 69 is threaded and goes through the nut-piece 71 which is slidable along a shaft 72 parallel to the shaft 69, so as to be prevented from turning. By this arrangement it is achieved that a displacement of the said piece 71 relatively to the bed plate 51 is proportional to a turning movement of the wheel body 66 and, consequently, also to a turning movement of the planet wheel 64 about the axis of the shafts 63 and 60, respectively. An index 73 of the piece 71 indicates on a scale 74 of the bed plate 51, which is graduated to represent lengths, the position the piece 71 has in each instance relatively to the bed plate 51, and this position, as is explained as the description proceeds, corresponds to the co-ordinate $X_1'$ of a certain point $P_1$ with respect to a system of rectangular co-ordinates, $X', Y'$. The appertaining co-ordinate $Y_1'$ of this point is indicated by an index 76, which is provided on another nut-piece 75, on a scale 77 of the bed plate 51 graduated to represent lengths. The said piece 75 is movable along a shaft 78 and meshes with a threaded spindle 79 which is parallel to the said shaft and can be turned by means of a hand-wheel 80. In order to impart the turning movements of the spindle 79 to a wheel body 81 revoluble on a shaft 82 carrying the wheel $r_4$, a toothed wheel 83 of the spindle 79 meshes with teeth 84 of the wheel body 81. The planet wheel 86 of a second differential gear is revolubly mounted on an arm 85 of the wheel body 81. Each of the two bevel gears 87 and 88 of this differential gear has the same number of teeth as the planet wheel 86. The bevel gear 87 is provided on the shaft 82, whereas the bevel gear 88 is fixed on the shaft 89 carrying the wheel $r_2$. The wheels $r_1$ and $r_1'$ are fixed to a shaft 90 whose rotation is imparted to a shaft 92 by means of a pair of bevel wheels 91. When the shaft 92 is rotated, a nut-piece 93, which meshes with a thread of the said shaft 92 and is guided along a shaft 94 parallel to the shaft 92, is imparted a displacement relatively to the bed plate 51, which is proportional to the rotation of the shaft 92 and, consequently, also to that of the shaft 90. An index 95 of the nut-piece 93 indicates on a scale 96, which is graduated to represent lengths and provided on the housing 52, the position the nut-piece 93 has in each instance relatively to the bed plate 51, which position, as will be explained as the description proceeds, corresponds to the co-ordinate $Y_1$ of the said point $P_1$ with respect to a system of rectangular co-ordinates, X, Y, turned relatively to the system $X', Y'$ by the said angle $\alpha$. The wheels $r_3$ and $r_3'$ are carried by a shaft 97 whose rotation is imparted to a shaft 99 by means of a pair of bevel wheels 98. When the shaft 99 is rotated, a nut-piece 100, which meshes with a thread of this shaft 99 and is slidable along a shaft 101 parallel to the said shaft 99, is given a displacement relative to the bed plate 51, which is proportional to the rotation of the shaft 99 and, consequently, also to that of the shaft 97. An index 102 of the nut-piece 100 indicates on a scale graduated to represent lengths, 103, of the housing 53 the position the nut-piece 100 has in each instance relatively to the bed plate, and, as explained farther below, this position corresponds to the co-ordinate $X_1$ belonging to the co-ordinate $Y_1$ of the said point $P_1$ with respect to the system X, Y.

When the co-ordinates $X_1'$ and $Y_1'$ of a point with respect to a system of rectangular co-ordinates, $X', Y'$, are known, and the corresponding co-ordinates $X_1$ and $Y_1$ of this point should be found with respect to a system of co-ordinates, X, Y, which is turned relatively to the system $X', Y'$ by the said angle $\alpha$. The hand-wheels 70 and 80 must be turned in such a way that the index 73 indicates on the scale 74 the value $X_1'$, and the index 76 on the scale 77 the value $Y_1'$, and then the index 102 indicates the sought value $X_1$ on the scale 103, and the index 95 the sought value $Y_1$ on the scale 96.

The device just described must come up to the equations 1 to 5 cited hereinbefore. For, when each of the equations 3 and 4, per se, is arrived at, also the equations 1, 2, and 5 are fulfilled, and the correct working of the device is proved, when it can be shown that the relations expressed by the equations $$X_1' = X_1 \cos \alpha + Y_1 \sin \alpha$$
$$X_1 = X_1 \cos \alpha - Y_1 \sin \alpha$$

are maintained. Now it can be easily deduced that a rotation (imparted by the hand-wheel 70 and, according to the arrangement, proportional to the indicated co-ordinate $X_1'$) of the wheel body 66 (together with the planet wheel 64) about the axis of the shaft 63 and a rotation (imparted by the hand-wheel 80 and, according to the arrangement, proportional to the indicated co-ordinate $Y_1'$) of the wheel body 81 (together with the planet wheel 86) about the axis of the shaft 82 (whereby a rotation is imparted to the shaft 90 which, according to the arrangement, is proportional to the indicated co-ordinate $Y_1$, and whereby a rotation is imparted also to the shaft 97 which, according to the arrangement, is proportional to the indicated co-ordinate $X_1$) give the following equations:

$$X_1' = \frac{1}{2}\frac{r_1'}{r_2'}Y_1 + \frac{1}{2}\frac{r_3'}{r_4'}X_1$$

$$Y_1' = \frac{1}{2}\frac{r_1}{r_2}Y_1 - \frac{1}{2}\frac{r_3}{r_4}X_1$$

With a view to prove the validity of these two equations, it is assumed for the sake of simplicity that the hand wheels 70 and 80 are manipulated successively.

When the hand wheel 80 is at rest, also the spindle 79, the wheels 83 and 84, and the wheel body 81, on which the planet wheel 86 of the differential gear 86, 87, 88 is rotatably mounted, are at rest. Therefore, when turning the hand wheel 70 and consequently, through the agency of the shafts 60, 90, 89 and 63, 97, 82, the crown wheels 88 and 87 of this differential gear, these crown wheels 88 and 87 as well as the shafts 89 and 82 are rotated only by equal amounts and in the reverse sense. When the shaft 89 is given $n$ revolutions per time unit, to the shaft 82 is therefore imparted in this time unit $n$ revolutions in the reverse sense. The shafts 89 and 90 being coupled by means of the pair of wheels $r_1$, $r_2$ to the shaft 90 is imparted in the time unit $$n_1 = n \cdot \frac{r_2}{r_1}$$

revolutions, and the shaft 90 being coupled to the spindle 92, the purpose of which is to displace the $Y_1$ nut piece 93, it follows that $Y_1 = C_1 \cdot n_1$, wherein $C_1$ is a constant of proportionality. Since the shafts 82 and 97 are coupled with each other by the wheels $r_3$, $r_0$, $r_4$, that is to say with $$n_2 = n \cdot \frac{r_4}{r_3}$$

revolutions of the shaft 97 per time unit, and since the shaft 97 is coupled to the spindle 99 for displacing the $X_1$ nut piece 100, consequently $X_1 = C_2 \cdot n_2$, wherein $C_2$ is a second constant of proportionality. Let the shafts 60 and 63 have per time unit a number of revolutions $n_3$ and, respectively, $n_4$. The shaft 60 being coupled to the shaft 90 by means of the wheels $r_1'$ and $r_2'$ there is valid the equation $$n_3 = n_1 \cdot \frac{r_1'}{r_2'}$$

and the shaft 63 being coupled to the shaft 97 by means of the wheels $r_3'$ and $r_4'$ there is valid the equation $$n_4 = n_2 \cdot \frac{r_3'}{r_4'}.$$

As the crown wheel 61 of the differential gear 61, 62, 64 is fixed to the shaft 60 and, consequently, makes $n_3$ revolutions per time unit, and as the crown wheel 62 is fixed to the shaft 63 and, consequently, makes $n_4$ revolutions per time unit, whereby, owing to the intermediate wheel $r_0$ provided between the wheels $r_3$ and $r_4$ for coupling the shafts 82 and 97, the two crown wheels must rotate in the same sense, the wheel body 66, on which the planet wheel 64 is rotatably mounted, makes about the axis of the shaft 63 per time unit $\frac{1}{2}\cdot(n_3+n_4)$ revolutions, and, as the wheel body 66 is coupled to the $X_1'$ nut piece 71 by means of the wheels 67, 68 and the spindle 69, $X_1' = C_3 \frac{1}{2}\cdot(n_3+n_4)$, wherein $C_3$ is a third constant of proportionality. From this and the aforementioned equations $$Y_1 = C_1 \cdot n_1, \ X_1 = C_2 \cdot n_2, n_3 = n_1 \cdot \frac{r_1'}{r_2'}, \text{ and}$$

$$n_4 = n_2 \cdot \frac{r_3'}{r_4'} \text{ can be deduced the equation}$$

$$X_1' = \frac{C_3}{C_1} \cdot \frac{1}{2} \cdot \frac{r_1'}{r_2'} \cdot Y_1 + \frac{C_3}{C_2} \cdot \frac{1}{2} \cdot \frac{r_3'}{r_4'} \cdot X_1$$

which, when the constants of proportionality $C_1$, $C_2$ and $C_3$ are given the correct values, allows of deducing the first of the said two equations the validity of which had to be proved.

The validity of the other of the two equations can be proved in quite the same manner.

These equations can be transferred into the two given farther above, provided the following two equations are still satisfied:

$$\cos \alpha = \frac{1}{2}\frac{r_1}{r_2} = \frac{1}{2}\frac{r_1'}{r_4'}$$

$$\sin \alpha = \frac{1}{2}\frac{r_3}{r_4} = \frac{1}{2}\frac{r_3'}{r_2'}$$

This means: For each angle $\alpha$ the gear ratios of the pairs of wheels $r_1$, $r_2$ and $r_3'$, $r_4'$ must be equal to one another and to twice the cosine of this angle $\alpha$ and the gear ratios of the pairs of wheels $r_3$, $r_4$ and $r_1'$, $r_2'$ must be to one another and to twice the sine of this angle $\alpha$. Hereby the negative sign in the equation for $Y_1'$ is taken into consideration by the use of the intermediate wheel $r_0$ (which is required for giving the wheel $r_3$ a reverse sense of rotation).

The gear ratio of the pair of wheels $r_1$, $r_2$ being equal to that of the pair of wheels $r_3'$, $r_4'$ and to 6:5, and the gear ratio of the pair of wheels $r_3$, $r_4$ being equal to that of the pair of wheels $r_1'$, $r_2'$ and to 8:5, as shown above, consequently the device must work correctly. The chosen wheels correspond to an angle $\alpha$ whose cosine is equal to $3/5$ and whose sine equal to $4/5$, viz. to an angle $\alpha \cong 53°\ 10'$.

I claim:

A device for transforming co-ordinates, comprising four indicating devices and four screw spindles, each of these indicating devices comprising a scale and an index adjustable along the scale by means of one of these screw spindles, two handwheels, each of these handwheels being connected to one of the said screw spindles, a gear train coupling those two screw spindles which are connected with a handwheel to the two other screw spindles in such a manner that on so turning the said first two screw spindles as to adjust the two appertaining indices along their respective scales according to the co-ordinates of a point with respect to a plane system of rectangular co-ordinates the said two other screw spindles are so turned that the two appertaining indices are adjusted along their respective scales according to the co-ordinates of this point with respect to another plane system of rectangular co-ordinates turned relatively to the said first system of co-ordinates about the origin of same, the said gear train comprising two differential gears and six shafts, two of these shafts being coupled to the said two other screw spindles, respectively, by means of toothed wheels, each of these two shafts being further coupled to two of the other four shafts by means of toothed wheels, each of the said two differential gears comprising three bevel gears, the axes of rotation of two of these bevel gears being stationary while the axis of rotation of the third bevel gear is rotatable in a plane, those four bevel gears of the said two differential gears which have stationary axes of rotation being rigidly connected to the said other four shafts, respectively, and the two other bevel gears being coupled to the said first two screw spindles, respectively, by means of toothed wheels.

WALTHER BAUERSFELD.